Patented Jan. 28, 1930

1,745,025

UNITED STATES PATENT OFFICE

HANS MILDNER, OF LEVERKUSEN, GERMANY, ASSIGNOR TO GENERAL ANILINE WORKS, INC., OF NEW YORK, N. Y., A CORPORATION OF DELAWARE

PROCESS OF PREPARING BETA SULPHO PHTHALIC ACID

No Drawing. Application filed September 4, 1928, Serial No. 303,952, and in Germany June 14, 1927.

The present invention relates to $\beta$-sulphophthalic acid and to a process of preparing same.

I have found that when reacting upon phthalic acid anhydride with fuming sulfuric acid in the presence of a small amount of a compound of the group comprising mercury and salts and oxides thereof, $\beta$-sulphophthalic acid is obtainable in a convenient manner. Advantageously the reaction may be performed with a fuming sulfuric acid of about 15–25% $SO_3$ content and at a temperature of about 110–150° C. When working according to these conditions the sulphonated phthalic acid of the probable formula:

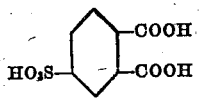

or the corresponding anhydride is obtainable in a nearly quantitative yield.

The following example illustrates my invention without limiting it thereto, the parts being by weight:

*Example.*—1 part of phthalic anhydride is heated to about 130° C. with 5 parts of 20% fuming sulfuric acid with the addition of 0,2 parts of mercuric sulfate for about 6–10 hours. After that time the mixture is cooled, poured into water and the $\beta$-sulphophthalic acid is isolated by salting out. It forms in form of its alkali metal salts a nearly colorless powder easily soluble in water, nearly insoluble in the usual organic solvents.

In the above example the mercuric sulfate may be replaced by metallic mercury or another suitable salt or oxide of mercury.

I claim:

1. Process of producing $\beta$-sulpho-phthalic acid which comprises reacting upon normal phthalic anhydride at a temperature of about 110–150° C. with fuming sulfuric acid of about 15–25% strength in the presence of a small amount of a compound of the group comprising mercury and its salts and oxides.

2. Process of producing $\beta$-sulpho-phthalic acid which comprises reacting upon normal phthalic anhydride at a temperature of about 130° C. with fuming sulfuric acid of 20% strength in the presence of a small amount of mercuric sulfate.

In testimony whereof I have hereunto set my hand.

HANS MILDNER. [L. S.]